(12) United States Patent
Schweid

(10) Patent No.: US 6,557,481 B1
(45) Date of Patent: May 6, 2003

(54) COMBINED OUTRIGGER AND FISHING ROD HOLDER

(76) Inventor: Ian Schweid, 2801 Florida Ave., Unit 225, Miami, FL (US) 33133

( * ) Notice: Subject to any disclaimer, the term of this patent is extended or adjusted under 35 U.S.C. 154(b) by 0 days.

(21) Appl. No.: 10/095,490

(22) Filed: Mar. 12, 2002

(51) Int. Cl.[7] ................................................ B63B 35/14
(52) U.S. Cl. ........................ 114/255; 114/364; 43/21.2
(58) Field of Search .................................. 114/255, 343, 114/364; 43/6.5, 18.1, 21.2, 27.4

(56) References Cited

U.S. PATENT DOCUMENTS 3,008,259 A * 11/1961 Zornes ...................... 43/43.12
3,060,614 A * 10/1962 Prince .......................... 43/6.5
4,876,980 A * 10/1989 Bell, III ...................... 114/364
6,213,441 B1 * 4/2001 Baynard et al. ............ 248/538

* cited by examiner

*Primary Examiner*—Stephen Avila
(74) *Attorney, Agent, or Firm*—Akerman Senterfitt; Michael Cesarano

(57) ABSTRACT

A combined outrigger and fishing rod holder for a boat having built-in fishing rod holders has a base with an upper section and a lower section where the lower section fits within a fishing rod holder on the boat and the upper section has a holder to receive and support the lower end of a fishing rod, a boom that is attached to the base and that is adjustable and extends outwardly from the boat, a clip attached to a pulley on the boom for holding a fishing line during trolling, the clip being positionable at any location along the boom.

11 Claims, 7 Drawing Sheets

COMBINED OUTRIGGER AND FISHING ROD HOLDER

FIELD OF THE INVENTION

This application relates generally to the field of fishing. More particularly, to outriggers associated with powerboats and the trolling of fishing lines outward and astern of a vessel.

DESCRIPTION OF THE PRIOR ART

In sport fishing, a traditional practice is the trolling of baits astern of the fishing vessel. To increase the number of baits that can be trolled at one time, outrigger devices are employed to hold the lines at spaced intervals parallel to the vessel's direction of travel, and creating sufficient distance between the lines to avoid their becoming entangled.

In the prior art, outriggers usually are formed of a tubular or pipe-like unit that extends outwardly from the sides of a fishing vessel. The unit is often adjustable between an inboard or stowed position and an extended or trolling position. On larger sport fishing boats, outrigger devices are of the tubular mast type, and have a pivot at their inboard ends that is permanently attached to a vertical portion of the cabin or some other part of the boat superstructure. Boom elements enable the outrigger to be firmly held in the stowage or trolling positions while permitting easy transition between each position. Outriggers of this type are disclosed in U.S. Pat. No. 4,632,050 to Rupp, and U.S. Pat. No. 4,889,064, to Rupp, III.

On smaller fishing boats, the outrigger devices are less complicated than the tubular mast type used on larger sport fishing boats. Typically, such outriggers comprise only a single length of tubing that has a pivot at the inboard end that is connected or inserted to the gunwale or equivalent horizontal surface of the boat, as is shown in U.S. Pat. No. 3,008,259 to Zornes. These are often operated with a specifically designed gunwale mount, as in U.S. Pat. No. 5,445,102 to Rupp, and U.S. Pat. No. 5,921,196 to Slatter, and are easily removable from the vessel. This design, mounting, and use has been refined for use with permanently attached aluminum structures over the helm of vessels such as T-tops or arches, as in U.S. Pat. No. 4,993,346 to Rupp.

The present invention further advances the art of outrigger design for use on smaller fishing boats by providing an outrigger and supporting apparatus that extends a fishing line outwardly from the vessel while holding the fishing rod to which the extended fishing line is connected. The device may be inserted into a standard flush mounted rod holder, such as those installed into the gunwales of most fishing vessels. No specific mounting device will be necessary for operation.

SUMMARY OR THE INVENTION

It is the object of this invention to provide an outrigger that will support a traditional fishing rod used for trolling, and will extend the line from the fishing rod outwardly from the side of the fishing vessel. The outward extension of the fishing line from the fishing vessel is achieved by using a boom that is adjustable from an inboard or stowed position to an outward or trolling position.

Another object of this invention is to allow rotational movement of the boom about a vertical axis to ensure the desired orientation of the boom with respect to the gunwale of the fishing vessel.

Still another object of this invention is to utilize a pulley system to adjust the distance along the boom that the trolled fishing line will be maintained. In conjunction with the pulley system, a quick release clip will be used to hold the fishing line outward from the vessel while trolling and will release the fishing line when rapid pressure is applied to the trolled bait.

Still another object of this invention is have an outrigger apparatus that is received and supported within a standard flush mounted rod holder, making specially designed gunwale mounts unnecessary.

DESCRIPTION OF THE PREFERRED EMBODIMENT

The present invention will now be fully described with reference to the accompanying drawings, in which preferred embodiments of the invention are shown. This invention may, however, be embodied in many different forms and should not be constructed as limited to the embodiments set forth herein. Rather, these embodiments are provided so that this disclosure will be thorough and complete in conveying the scope of the invention. Like numbers refer to like elements in all drawings.

Figure 1:
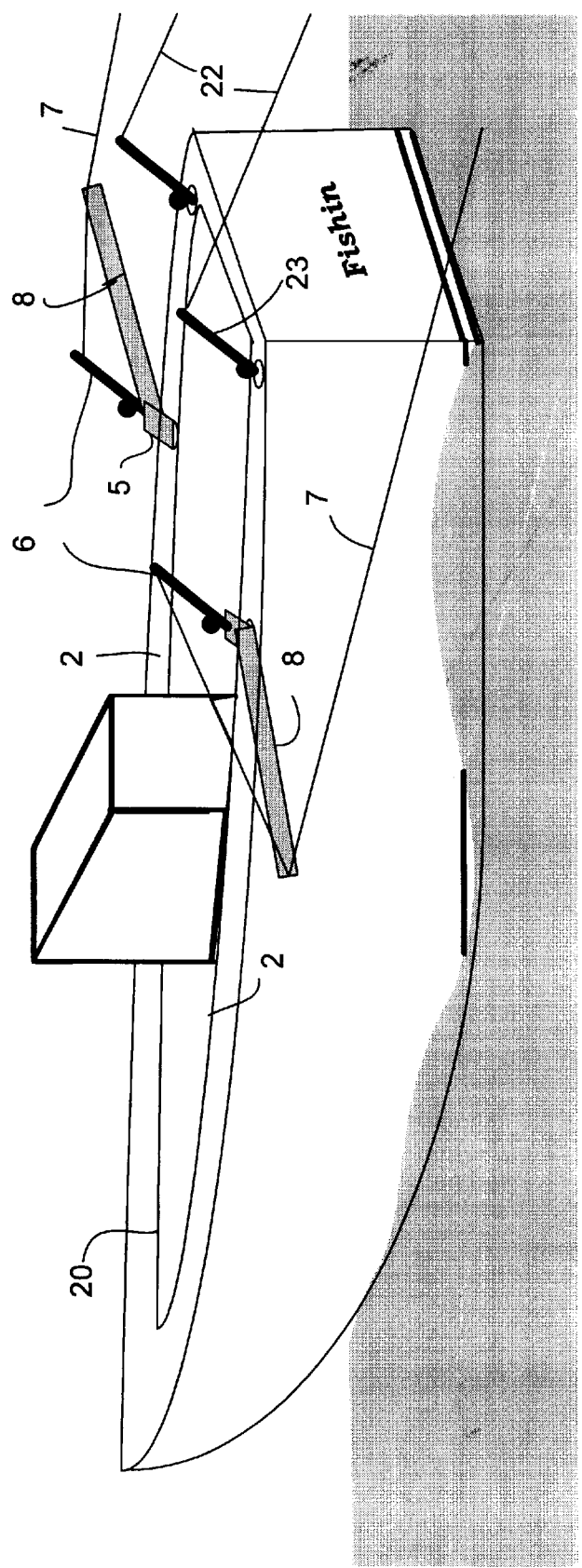
FIG. 1 is a perspective view of a sport fishing vessel trolling fishing lines. The apparatus of the present invention is in use in the forward rod holders.

FIG. 1 shows a traditional fishing vessel 20 trolling fishing lines 7 and 22. Fishing lines 7 are attached to forward fishing rods 6 in use with the present invention located within the forward rod holders (not seen). The boom section 8 of the present invention is shown in the trolling position holding fishing line 7 outward from the gunwale 2 of the fishing vessel to create separation from fishing line 22.

Figure 2:
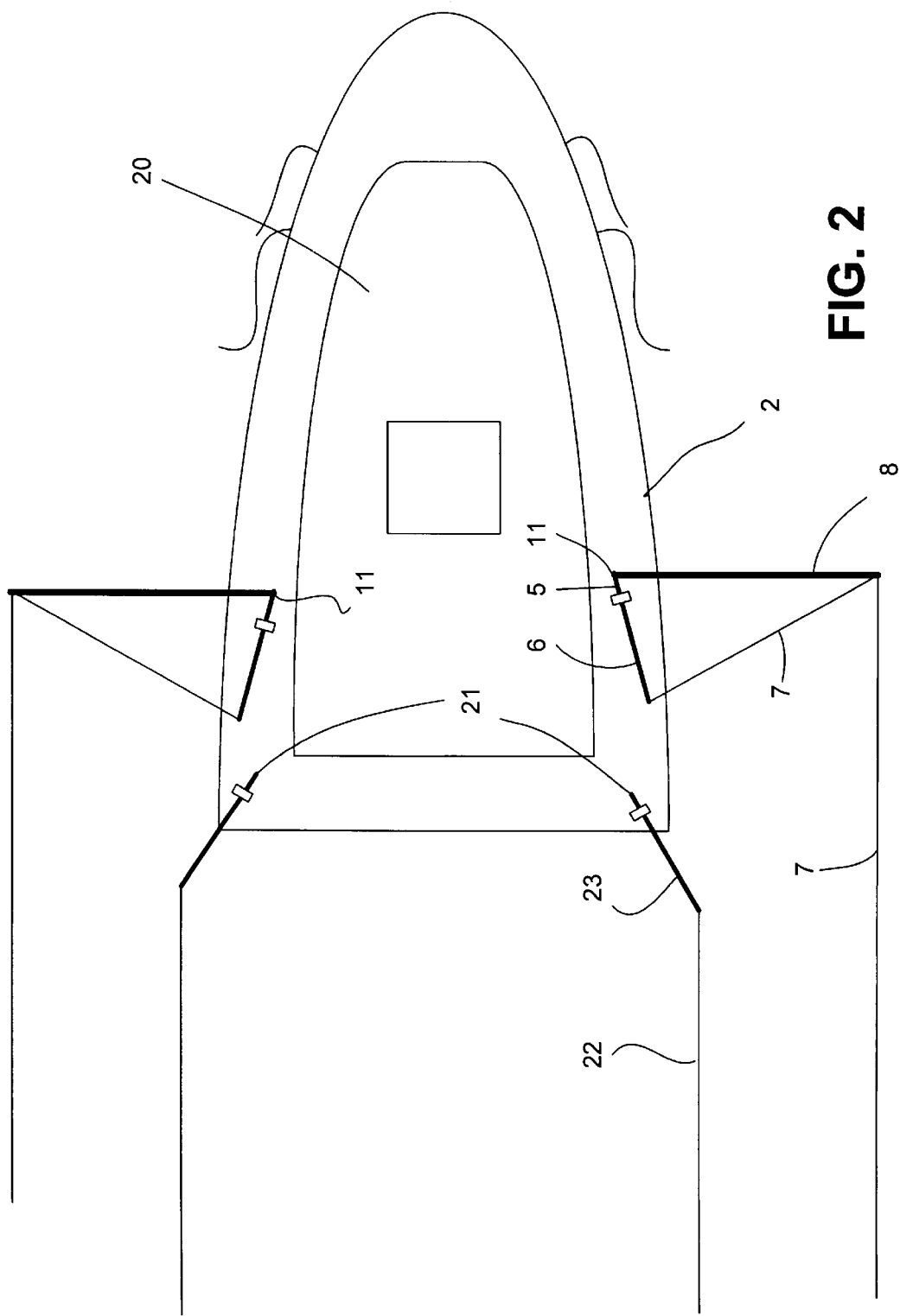
FIG. 2 is a plan view of a sport fishing vessel trolling fishing lines from fore and aft fishing rods on both the port and starboard sides. In both the port and starboard foreword rod holders, the outrigger of the present invention is utilized to hold the fishing rods currently in use.

Referring now to FIG. 2, shown is a standard fishing vessel 20 having trolling lines 7 and 22 extending rearward as the vessel moves in a forward direction. Extension of the fishing lines associated with the forward fishing rods outwardly from the vessel is achieved through using the outrigger of the present invention to create the necessary separation to avoid entanglement with fishing lines trolled from the fishing rods located in the aft rod holders.

As shown, the vessel has gunwales 2 which contain permanently mounted cylinders 11 and 21 for holding fishing rods. The cylinders are commonly referred to as "flush mounted rod holders." The outriggers of the present invention are mounted in forward rod holders 11, which, in turn, each hold a fishing rod 6. The base section 5 of the outrigger of this invention is designed to hold a fishing rod 6 with associated fishing line 7. A pulley system is used to move fishing line 7 outwardly from the gunwale of the fishing vessel to create separation from the fishing line 22, which is being trolled from the fishing rod 23 contained within the aft rod holder 21. The pulley system runs substantially the length of the boom 8 of the present invention, and has a quick release clip near the end of the boom to hold the line during trolling.

Figure 3:
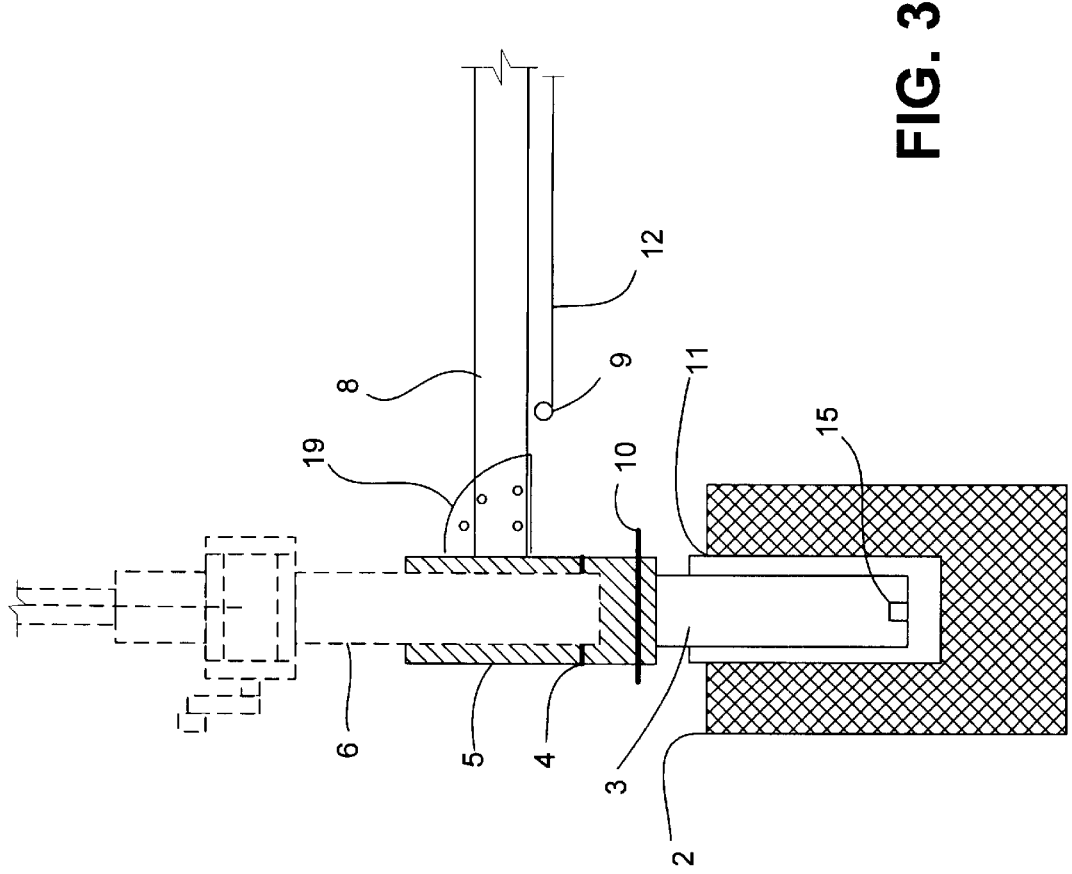
FIG. 3 is a front elevational view of the outrigger of the present invention located in the starboard foreword rod holder of the vessel shown in FIG. 2.

FIG. 3 shows a cross-sectional view of the gunwale 2 of the vessel with the base portion of the outrigger of this invention inserted into a flush mounted rod holder 11 in the gunwale. The base of the outrigger has an upper section 5 that fits within and is normally locked to a lower section 3 by means of a locking pin 10. A boom 8 is attached to the upper section 5 by means of a boom joint 19. A number of pinholes through the upper and lower sections permit relative rotational positioning of the upper section within the lower section when the locking pin 10 is removed. When a desired rotational positioning of the upper section is achieved, it may be locked in place through the use of the locking pin 10.

The lower section 3 of the base is inserted in the rod holder. A notch 15 is located at the bottom of the lower section, and is designed for proper seating of the outrigger in rod holders containing a seating pin. The base can be removed at will from the flush mounted rod holder in a manner similar to the removal of a standard fishing rod.

The upper section 5 of the base is cylindrical, forming an annular recess, and is configured to hold the lower end of a standard fishing rod 6. The upper section contains a seating pin 4 for securing fishing rods containing a notch at the end of the rod handle.

FIG. 3 shows the pulley system located on the boom that allows for the outward movement of the fishing line from the gunwale of the vessel. The boom 8 utilizes a pulley 12 to allow adjustment of the specific location of the trolled fishing line along the boom. The pulley system operates between two circular eyelets or pulley wheels 9 and 14 permanently attached to the boom, and utilizes a quick release clip 13 to hold the fishing line while trolling takes place.

Figure 4:
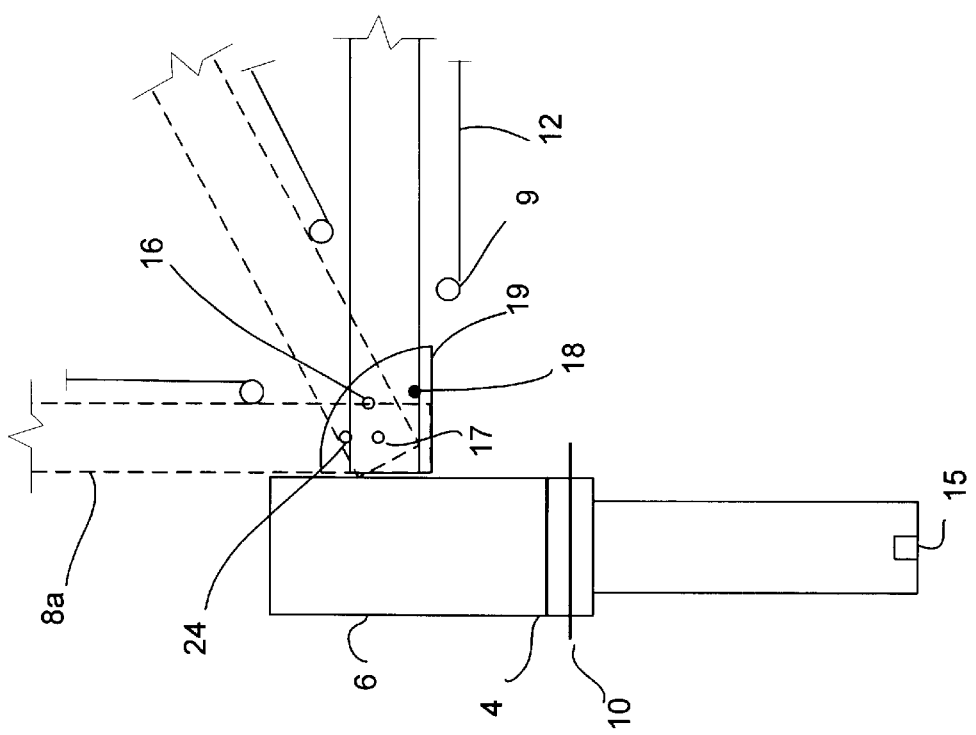
FIG. 4 is a side elevational view of the outrigger of the present invention.

In FIG. 4, a range of vertical motion of the boom 8 is shown in various positions. The boom may rotate about a fixed pivot 17 located on the boom joint 19, and can be held at a given angle by inserting a pin through pinholes 16, 18, or 24. The range of motion for the boom while in use varies between 0 degrees from the horizon to about 90 degrees.

Figure 5:
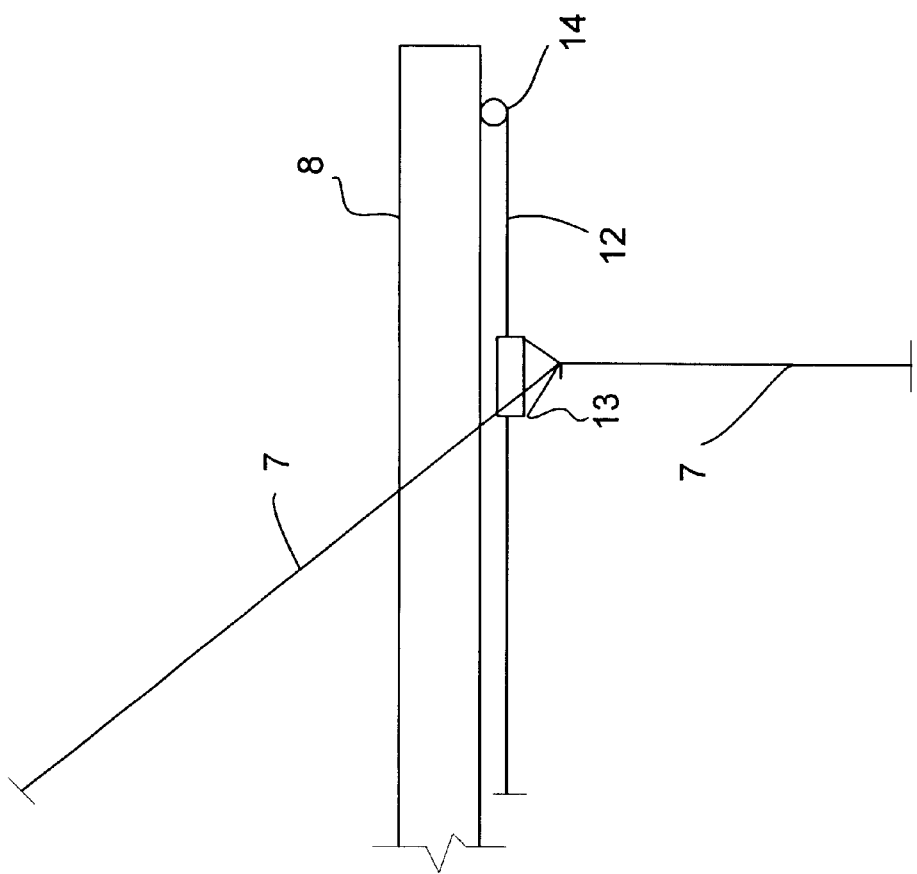
FIG. 5 is a front elevation view of the outward end of the outrigger boom including a more detailed view of the pulley system utilized by the present invention.

FIG. 5 is a side elevation view of the outward end of the boom section 8 of the current invention. This view illustrates in more detail the pulley section 12 associated with the boom 8 that controls the location of the fishing line 7. The pulley system 12 operates between pulley wheels 14 and 9 (not shown) located on the boom section 8. Along the pulley a quick release clip 13 holds the fishing line 7 in place while being trolled.

Figure 6:
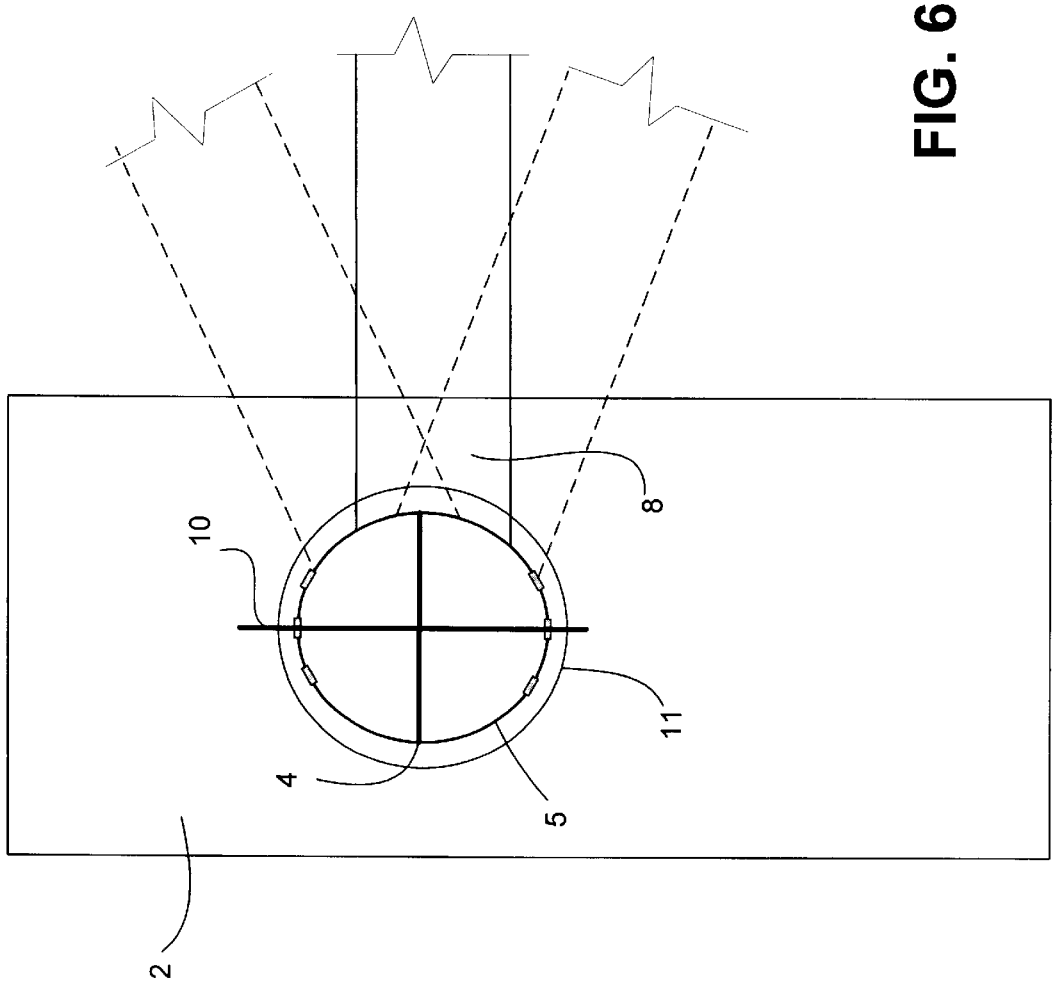
FIG. 6 is a plan view of the outrigger of the present invention inserted into a standard flush mounted rod holder on the gunwale of the fishing vessel.

FIG. 6 is a plan view of the upper section of the outrigger of the present invention. As shown in FIG. 6, seating pin 4 is visible within the upper section, and will prevent any fishing rod having a notch at the end from rotating in the cylinder. Rotational movement of the boom 8 and upper section within the lower section may be controlled by removing and reinserting adjustment pin 10. Positional holes for adjusting the rotational movement of the upper section extend through the lower portion of upper section 5.

Figure 7:
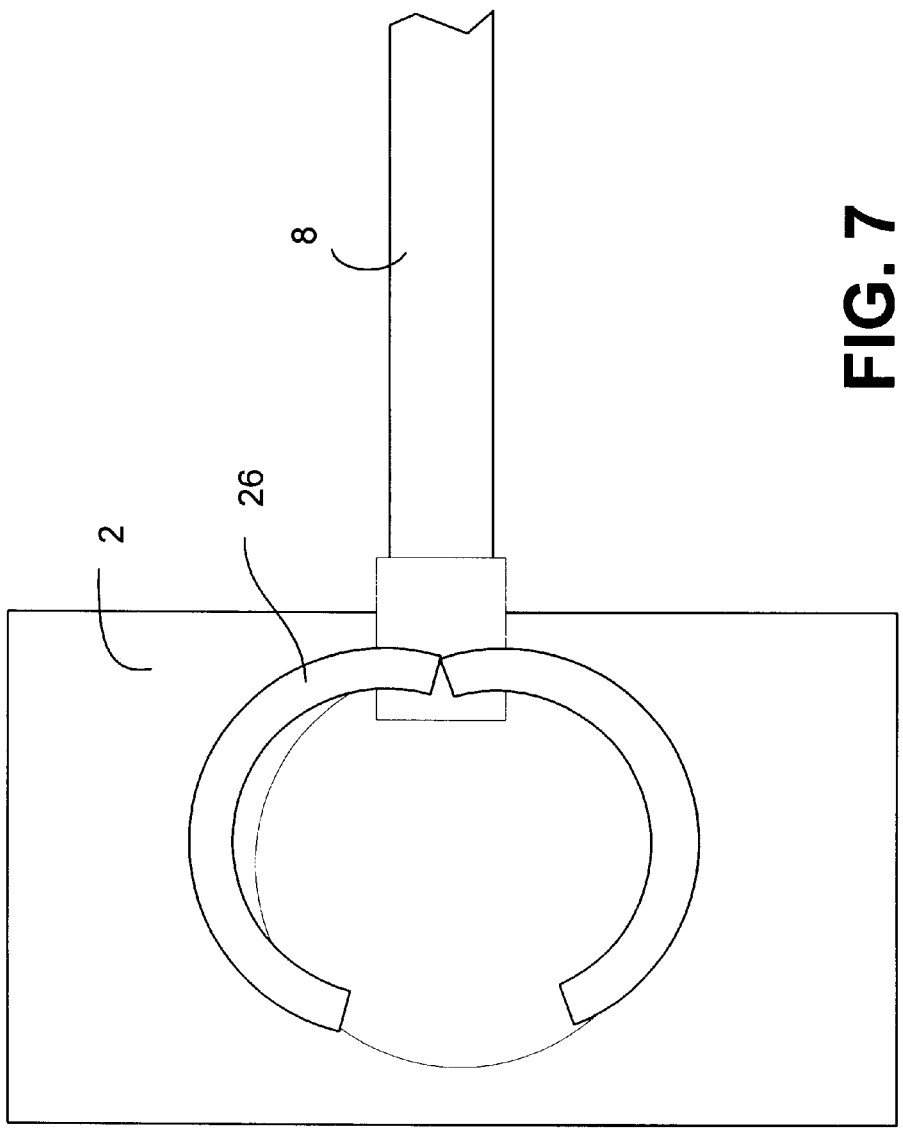
FIG. 7 is a plan view of the outrigger of the present invention created with an alternative rod holding configuration.

FIG. 7 shows an alternative embodiment of the invention in which the upper section of the base does not form a full annular recess, but consists of straps or "fingers" that may extend around the lower handle of the fishing rod. In this embodiment, the straps or fingers may have buckles (not shown) or some other releasable means for attaching them around the fishing rod, or they may be partially rigid, and simply hold the rod until greater forces cause the fingers to open. Other, non-preferred embodiments may be used for supporting the fishing rod upon the base of the outrigger, such as through the use of Velcro or some other releasable attachment means, without departing from the scope of the invention.

The outrigger of this invention is suitable for use in small boats having rigidly attached rod holders. Although the boat will preferably have flush mounted rod holders, the invention is not limited to this kind of boat, but will provide excellent results with any boat having rigidly-mounted fishing rod holders. The assembly is easily installed and removed, and provides the boater with versatility in using the boat for troll fishing with the outriggers installed, and for other recreational uses when they are removed. Because the outriggers may be manufactured in different sizes, and are not permanently mounted, a boater may select and use a larger or smaller outrigger, depending upon the particular occasion.

While the invention has been disclosed and described in accordance with the preferred embodiments known to the inventor, the invention is not so limited, and is to be given the broadest scope consonant with the following, appended claims.

What is claimed is:

1. A combined outrigger and fishing rod holder for a boat having rigidly supported fishing rod holders, comprising:
    a base having an upper section and a lower section,
    said lower section fitting within and being supported by a rigidly supported fishing rod holder on said boat,
    said upper section having support means to receive and support the lower end of a removable fishing rod,
    a boom being attached to said base and extending outwardly from said boat, holding means adjacent to said boom for releasably holding a fishing line from said fishing rod such that said holding means suspends said fishing line over the water, said holding means being positionable at any location along the length of said boom.

2. A combined outrigger and fishing rod holder as claimed in claim 1 wherein said upper section support means comprises a cylinder having an annular recess for receiving the lower end of said fishing rod.

3. A combined outrigger and fishing rod holder as claimed in claim 1 wherein said upper section support means comprises a support member having attachment means for holding the lower end of said fishing rod.

4. A combined outrigger and fishing rod holder for a boat having rigidly supported fishing rod holders, comprising:
    a base having an upper section and a lower section,
    said lower section fitting within and being supported by a rigidly supported fishing rod holder on said boat,
    said upper section having support means to receive and support the lower end of a fishing rod and comprising a cylinder having an annular recess for receiving the lower end of a removable fishing rod, said upper section and said lower section having a common longitudinal axis, said upper section being rotatable about said common longitudinal axis with respect to said lower section, a boom extending outwardly from said boat and being attached to and rotatable with said upper section, holding means adjacent to said boom for releasably holding a fishing line from said fishing rod such that said holding means suspends said fishing line over the water, said holding means being positionable at any location along the length of said boom.

5. A combined outrigger and fishing rod holder as claimed in claim 4 wherein said holding means comprise a pulley extending substantially along the length of said boom, said pulley further comprising a plurality of pulley wheels and a substantially continuous line, said substantially continuous line being movable and being attached to a clip, said clip being movable along the length of said pulley, and releasably holding said fishing line at any desired position along the length of said boom.

6. A combined outrigger and fishing rod holder as claimed in claim 5 further comprising securing means for releasably securing said upper section against rotation with respect to said lower section such that said upper section may rotate with respect to said lower section when said securing means are released and said upper section cannot rotate with respect to said lower section when said securing means are not attached.

7. A combined outrigger and fishing rod holder as claimed in claim 6 wherein said securing means comprises a removable pin.

8. A combined outrigger and fishing rod holder as claimed in claim 5 further comprising elevational means for raising and lowering the outboard end of said boom while keeping the inboard end of said boom at a constant height relative to the surface of the water.

9. combined outrigger and fishing rod holder as claimed in claim 8 wherein said elevational means comprises a hinge.

10. A combined outrigger and fishing rod holder as claimed in claim 9 further comprising a notch at the lower end of said lower section for receiving a pin in said fishing rod holder to secure said lower section from rotating with respect to said fishing rod holder, and a pin at the lower end of said upper section for fitting into a notch at the end of a fishing rod to secure said fishing rod from rotating with respect to said upper section.

11. Apparatus for holding a fishing line outboard of a boat having mounted fishing rod holders, comprising:

a boom having an inboard end being attached to a base and an outboard end that extends over the water, a pulley running substantially the length of said boom and comprising a clip for holding a fishing line above the water near to said boom and outboard of said boat, said base comprising an upper portion, a lower portion, and a locking pin, said inboard end of said boom being attached to said base with a hinge, said hinge allowing vertical movement and vertical positioning of said outboard end of said boom with respect to said base, said upper portion of base being rotatable upon said lower portion of said base when said locking pin is removed, and being held stationary upon said lower portion of said base when said locking pin is inserted through said base, said upper portion of said base forming an annular recess within which the base of a fishing rod may be received, said lower portion of said base forming a cylinder, said cylinder being elongated to be received and supported by a fishing rod holder mounted on said boat.

* * * * *